(12) United States Patent
Fang

(10) Patent No.: US 9,110,199 B2
(45) Date of Patent: Aug. 18, 2015

(54) BACKLIGHT MODULE AND LIQUID CRYSTAL DISPLAY

(75) Inventor: Kuojun Fang, Shenzhen (CN)

(73) Assignee: SHENZHEN CHINA STAR OPTOELECTRONICS TECHNOLOGY CO. LTD., Shenzhen (CN)

(*) Notice: Subject to any disclaimer, the term of this patent is extended or adjusted under 35 U.S.C. 154(b) by 0 days.

(21) Appl. No.: 13/511,657

(22) PCT Filed: Apr. 9, 2012

(86) PCT No.: PCT/CN2012/073636
§ 371 (c)(1),
(2), (4) Date: May 24, 2012

(87) PCT Pub. No.: WO2013/143162
PCT Pub. Date: Oct. 3, 2013

(65) Prior Publication Data
US 2015/0023056 A1    Jan. 22, 2015

(30) Foreign Application Priority Data

Mar. 29, 2012 (CN) .......................... 2012 1 0088238

(51) Int. Cl.
*F21V 7/04*     (2006.01)
*F21V 8/00*     (2006.01)
*G02F 1/1335*   (2006.01)

(52) U.S. Cl.
CPC .............. *G02B 6/0015* (2013.01); *G02B 6/002* (2013.01); *G02B 6/0016* (2013.01); *G02B 6/0068* (2013.01); *G02F 1/1336* (2013.01)

(58) Field of Classification Search
CPC .. G02B 6/0015; G02B 6/0031; G02B 6/0028; G02B 6/0068
USPC ....................... 362/609, 623, 97.1, 97.2, 97.3
See application file for complete search history.

(56) References Cited

U.S. PATENT DOCUMENTS

| | | | | |
|---|---|---|---|---|
| 6,139,163 | A * | 10/2000 | Satoh et al. | 362/612 |
| 8,059,230 | B2 * | 11/2011 | Yeh | 349/67 |
| 2004/0252483 | A1 * | 12/2004 | Cheng | 362/31 |
| 2007/0274100 | A1 * | 11/2007 | Yang et al. | 362/615 |
| 2008/0285309 | A1 * | 11/2008 | Fang et al. | 362/620 |
| 2009/0015753 | A1 * | 1/2009 | Ye | 349/64 |
| 2009/0016057 | A1 * | 1/2009 | Rinko | 362/268 |
| 2012/0050649 | A1 * | 3/2012 | Yeo | 349/65 |

* cited by examiner

*Primary Examiner* — Anh Mai
*Assistant Examiner* — Glenn Zimmerman
(74) *Attorney, Agent, or Firm* — Mark M Friedman

(57) ABSTRACT

The present invention discloses a backlight module and a liquid crystal display. The light guide plate is formed with hollow structures therein, and the hollow structures includes a first reflecting surface and a second reflecting surface; the first reflecting surface has a first inclination; the second reflecting surface has a second inclination; based on the first inclination, the first reflecting surface reflects light emitting toward the first reflecting surface; and based on the second inclination, the second reflecting surface reflects light emitting toward the second reflecting surface.

10 Claims, 3 Drawing Sheets

BACKLIGHT MODULE AND LIQUID CRYSTAL DISPLAY

FIELD OF THE INVENTION

The present invention relates to the field of liquid crystal display technology, and more particularly to a backlight module and a liquid crystal display.

BACKGROUND OF THE INVENTION

With the development trend of compactness of the liquid crystal display, it needs fewer and fewer light emitting diodes (LEDs).

Referring to FIG. 1, in the side-light type LED backlight module, the decrease of the LED causes the increase of the pitch P' between the LEDs. After the light is emitted from the LED 11' to the light guide plate 12', the refraction effect occurs because the density of the light guide plates 12' is different to and generally smaller than the density of air.

A portion of light emitted from the LED 11' perpendicularly enters the light guide plate 12', and the opening angle of the portion of the vertical incident light is $\theta_{air}=90°$. After the portion of the light enters the light guide plate 12', the opening angle changes to $\theta_{LGP}=\arcsin(1/n_{LGP})$, apparently $\theta_{LGP}<90°$.

For the light concentrating around the portion of the vertical incident light, when the light mixing distance d maintains unchanged, the smaller $\theta_{LGP}$ is, the more easily the portion of the light distributes intensively in a certain range of the light guide plate 12'. As a result, it leads to the hotspot phenomenon in the liquid crystal display.

Thus, how to solve the technical problem of the traditional technology that the vertical incident light of the light guide plate and the light concentrating around the vertical incident light enter the light guide plate and then distribute intensively in a certain range of the light guide plate and thereby leads to the hotspot phenomenon in the liquid crystal display is one of the research trends in the technology field of liquid crystal display.

SUMMARY OF THE INVENTION

One object of the present invention is to provide a backlight module to solve the technical problem of the traditional technology that the vertical incident light of the light guide plate and the light concentrating around the vertical incident light enter the light guide plate and then distribute intensively in a certain range of the light guide plate and thereby leads to the hotspot phenomenon in the liquid crystal display.

To solve the problem mentioned above, the present invention constructs a backlight module, comprising a light source and a light guide plate; wherein the light guide plate includes a light input surface formed one side thereof, and the light source is close to the light input surface, wherein the light guide plate is formed with hollow structures therein, the hollow structures are corresponding to the light source, and the light guide plate has a first reflecting surface, a second reflecting surface and a third reflecting surface along a thickness direction of the light guide plate;

wherein the first reflecting surface has a first inclination in relation to a vertical incident direction horizontally perpendicular to the light input surface between the light source and the light guide plate; the second reflecting surface has a second inclination in relation to the vertical incident direction, and the tilt direction of the first inclination is opposite to that of the second inclination; light entering the light guide plate along the vertical incident direction has a refracting angle, and the sum of the first inclination and the refracting angle is less than or equal to 45°; and wherein light emitted from the light source corresponding to the hollow structure and emitting toward the first reflecting surface is reflected by the first reflecting surface based on the first inclination; light emitted from the light source corresponding to the hollow structure and emitting toward the second reflecting surface is reflected by the second reflecting surface based on the second inclination.

According to the backlight module of the present invention, the sum of the second inclination and the refracting angle is less than or equal to 45°.

According to the backlight module of the present invention, a maximum distance between the third reflecting surface and the light input surface of the light guide plate is less than a light mixing distance of the backlight module;

the hollow structure has a hollow length along the vertical incident direction, and the hollow length is less than the light mixing distance of the backlight module.

According to the backlight module of the present invention, the third reflecting surface is a planar surface According to the backlight module of the present invention, the third reflecting surface is a curved surface.

According to the backlight module of the present invention, the third reflecting surface is a circular curved surface; on a horizontal surface of the light guide plate, an included angle between the vertical incident direction and any one of tangents of the circular curved surface is less than the first inclination.

According to the backlight module of the present invention, an included angle between the vertical incident direction and any one of tangents of the circular curved surface is less than the second inclination.

According to the backlight module of the present invention, the hollow structure has a hollow depth D along the thickness direction of the light guide plate; the third reflecting surface and a light mixing line of the backlight module have a minimum distance L therebetween; the hollow structure has a minimum emergent opening angle δ at the light mixing line; the hollow depth, the minimum distance and the minimum emergent opening angle δ satisfy the following formula:

$$\sin\delta \leq n_{LGP} \times \sin(a\tan(L/D)), \text{ wherein } n_{LGP} \text{ is the refractive index of the light guide plate.}$$

Another objectives of the present invention is to provide a backlight module to solve the technical problem of the traditional technology that the vertical incident light of the light guide plate and the light concentrating around the vertical incident light enter the light guide plate and then distribute intensively in a certain range of the light guide plate and thereby leads to the hotspot phenomenon in the liquid crystal display.

To solve the problem mentioned above, the present invention constructs a backlight module, comprising a light source and a light guide plate; wherein the light guide plate includes a light input surface formed one side thereof, and the light source is close to the light input surface, wherein the light guide plate is formed with hollow structures therein, the hollow structures are corresponding to the light source, and the light guide plate has a first reflecting surface and a second reflecting surface along a thickness direction of the light guide plate;

wherein the first reflecting surface has a first inclination in relation to a vertical incident direction horizontally perpendicular to the light input surface between the light source and the light guide plate; the second reflecting surface has a second inclination in relation to the vertical incident direction, and the tilt direction of the first inclination is opposite to that of the second inclination; and wherein light emitted from the light source corresponding to the hollow structure and emitting toward the first reflecting surface is reflected by the first reflecting surface based on the first inclination; light emitted from the light source corresponding to the hollow structure and emitting toward the second reflecting surface is reflected by the second reflecting surface based on the second inclination.

According to the backlight module of the present invention, light entering the light guide plate along the vertical incident direction has a refracting angle, and the sum of the first inclination and the refracting angle is less than or equal to 45°.

According to the backlight module of the present invention, the sum of the second inclination and the refracting angle is less than or equal to 45°.

According to the backlight module of the present invention, the hollow structure further includes a third reflecting surface; a maximum distance between the third reflecting surface and the light input surface of the light guide plate is less than a light mixing distance of the backlight module; the hollow structure has a hollow length along the vertical incident direction, and the hollow length is less than the light mixing distance of the backlight module.

According to the backlight module of the present invention, the third reflecting surface is a planar surface.

According to the backlight module of the present invention, the third reflecting surface is a curved surface.

According to the backlight module of the present invention, the third reflecting surface is a circular curved surface; on a horizontal surface of the light guide plate, an included angle between the vertical incident direction and any one of tangents of the circular curved surface is less than the first inclination.

According to the backlight module of the present invention, the included angle between the vertical incident direction and any tangent of the circular curved surface is less than the second inclination.

According to the backlight module of the present invention, the hollow structure has a hollow depth D along the thickness direction of the light guide plate; the third reflecting surface and a light mixing line of the backlight module have a minimum distance L therebetween; the hollow structure has a minimum emergent opening angle δ at the light mixing line; the hollow depth, the minimum distance and the minimum emergent opening angle δ satisfy the following formula:

$$\sin \delta \leq n_{LGP} \times \sin(a\tan(L/D)), \text{ wherein } n_{LGP} \text{ is the refractive index of the light guide plate.}$$

Another object of the present invention is to provide a liquid crystal display to solve the technical problem of the traditional technology that the vertical incident light of the light guide plate and the light concentrating around the vertical incident light enter the light guide plate and then distribute intensively in a certain range of the light guide plate and thereby leads to the hotspot phenomenon in the liquid crystal display.

To solve the problem mentioned above, the present invention constructs a liquid crystal display, comprising: a light source and a light guide plate; wherein the light guide plate includes a light input surface formed one side thereof, and the light source is close to the light input surface;

wherein the light guide plate is formed with hollow structures therein corresponding to the light source, and the light guide plate has a first reflecting surface and a second reflecting surface along a thickness direction of the light guide plate;

wherein the first reflecting surface has a first inclination in relation to a vertical incident direction horizontally perpendicular to the light input surface between the light source and the light guide plate; the second reflecting surface has a second inclination in relation to the vertical incident direction, and the tilt direction of the first inclination is opposite to that of the second inclination;

wherein light emitted from the light source corresponding to the hollow structure and emitting toward the first reflecting surface is reflected by the first reflecting surface based on the first inclination; light emitted from the light source corresponding to the hollow structure and emitting toward the second reflecting surface is reflected by the second reflecting surface based on the second inclination.

Compared to the traditional technology, the light guide plate of the present invention is formed with hollow structures therein, and the hollow structures are corresponding to the light source; wherein the hollow structure reflects the vertical incident light and the light concentrating around the vertical incident light to present the scattering effect and thereby prevent the intensive distribution in a certain range of the light guide plate and the hotspot phenomenon.

For understanding the present invention described above more apparently, the specific preferable embodiments with the companying drawings will be exemplified and described more detailed, as follows:

DETAILED DESCRIPTION OF THE PREFERRED EMBODIMENTS

The following description of various embodiments refers to the companying drawings to exemplify specific embodiments in the present invention.

Figure 2:
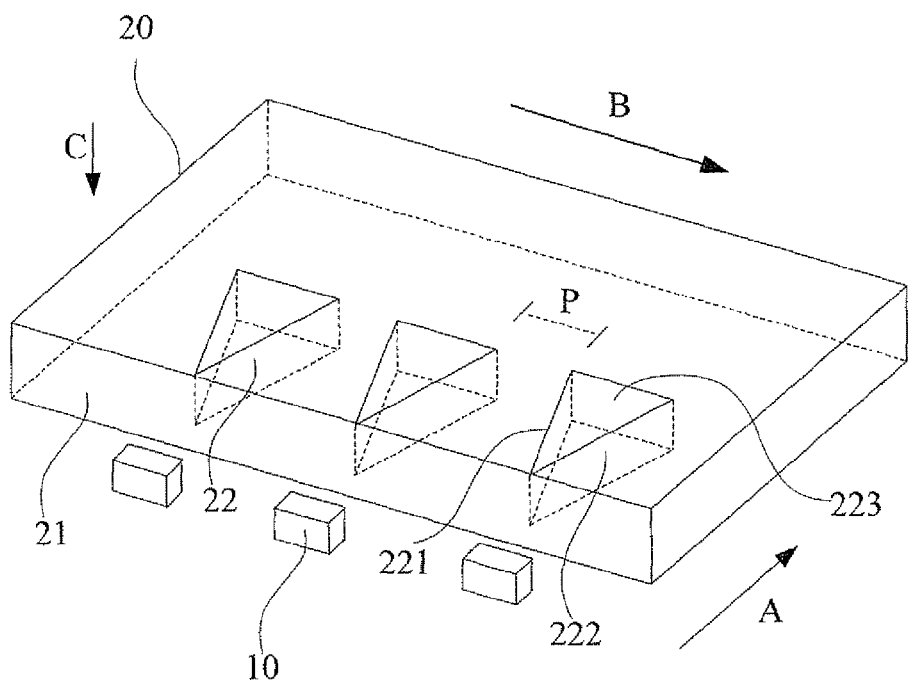
FIG. 2 is a structural schematic view according to a first preferred embodiment of the backlight module in the present invention.

Referring to FIG. 2, FIG. 2 is a structural schematic view according to a first preferred embodiment of the backlight module in the present invention.

The backlight module comprises a light source 10 and a light guide plate 20; wherein the light guide plate 20 includes a light input surface 21 and is formed with hollow structures 22 therein. Along the thickness direction C (that is, the longitudinal direction) of the light guide plate 20, the hollow structure 22 includes a first reflecting surface 221, a second reflecting surface 222 and a third reflecting surface 223.

Figure 3:
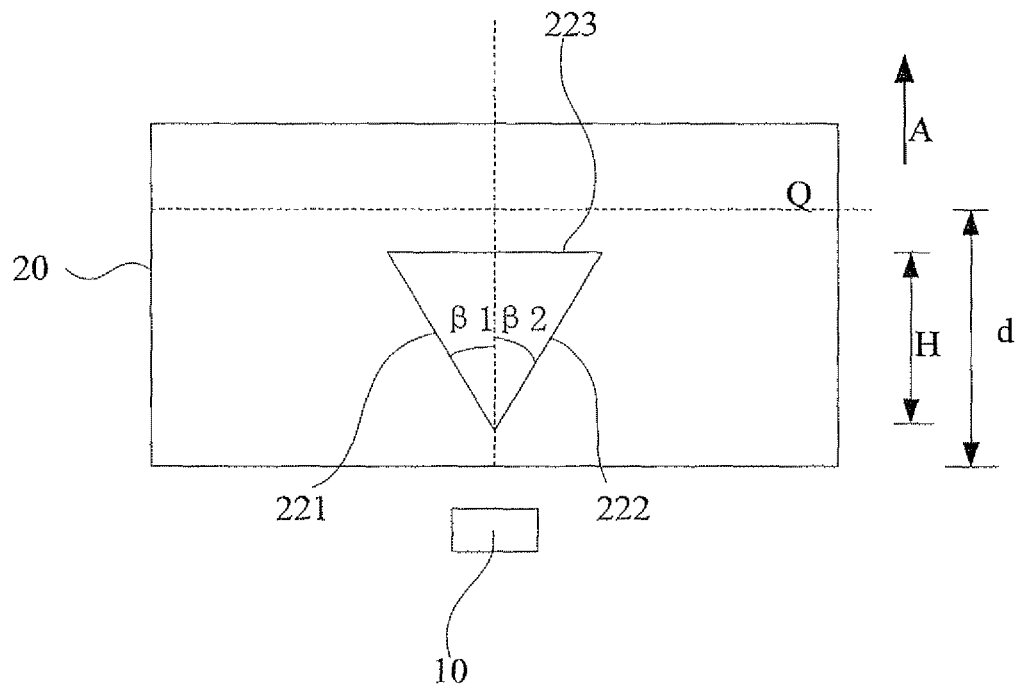
FIG. 3 is a structural schematic top view of FIG. 2.

Together with FIG. 3, FIG. 3 is a top view of one of the hollow structures 22 in FIG. 2.

Along the light source 10 and the light guide plate 20, the vertical incident direction A is horizontally perpendicular to the light input surface 21; the first reflecting surface 221 has a first inclination β1; based on the first inclination β1, light emitted from the light source 10 corresponding to the hollow structure 22 and emitting toward the first reflecting surface 221 is reflected by the first reflecting surface 221; the second reflecting surface 222 has a second inclination β2; based on the second inclination β2, light emitted from the light source 10 corresponding to the hollow structure 22 and emitting toward the second reflecting surface 222 is reflected by the second reflecting surface 222.

Wherein, the tilt direction of the first inclination is opposite to that of the second inclination. Specifically, the first inclination β1 rotates counterclockwise and the second inclination β2 rotates clockwise.

Figure 1:
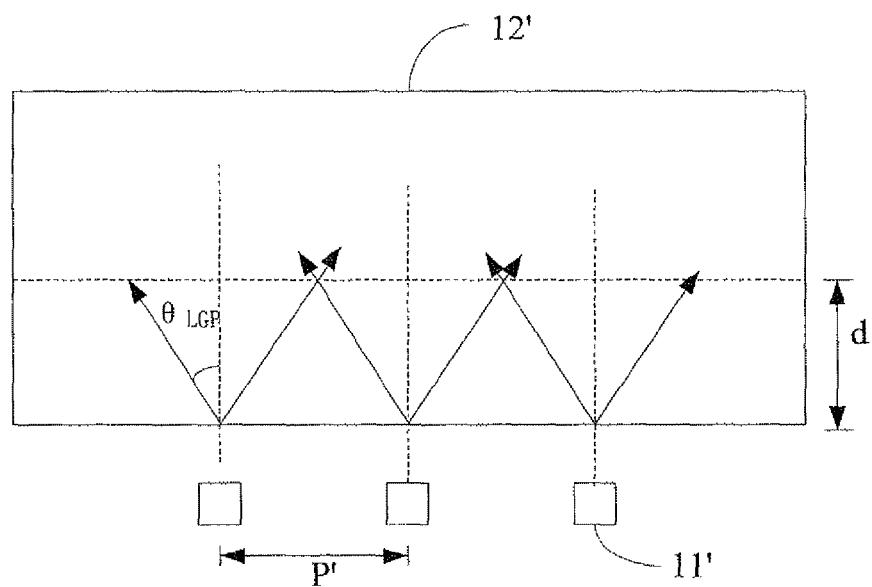
FIG. 1 is a structural schematic view of the backlight module in the traditional technology.

More specifically, the light entering the light guide plate 20 along the vertical incident direction has a refracting angle $θ_{LGP}$ (not shown; please refer to FIG. 1), the sum of the first inclination β1 and the refracting angle $θ_{LGP}$ is less than or equal to 45°, that is:

β1≤45°−$θ_{LGP}$;

Under this condition, the first reflecting surface 221 can reflect the received light; wherein the light is emitted from the light source 10 corresponding to the hollow structure 22. And the light is the vertical incident light emitting toward the hollow structure 22 and the light concentrating around the vertical incident light; after being reflected by the first reflecting surface 221 of the hollow structure 22, the light continue to progress along the direction A with the scattering effect, then prevent the light from distributing intensively in the light guide plate 20 and thereby prevent the hotspot phenomenon in the liquid crystal display.

More specifically, the sum of the second inclination β2 and the refracting angle $θ_{LGP}$ is less than or equal to 45°, that is:

β2≤45°−$θ_{LGP}$;

Under this condition, the second reflecting surface 222 can reflect the received light; wherein the light is emitted from the light source 10 corresponding to the hollow structure 22. And the light is the vertical incident light emitted to the hollow structure 22 and the light concentrating around the vertical incident light; after being reflected by the second reflecting surface 222 of the hollow structure 22, the light continue to progress along the direction A with the scattering effect, then prevent the light from distributing intensively in the light guide plate 20 and thereby prevent the hotspot phenomenon in the liquid crystal display.

In the specific embodiment, the third reflecting surface 223 is preferably a planar surface, meanwhile the horizontal plane B of the hollow structure 22 is formed with triangular cross-section structures (referring to FIG. 3). Alternatively, the third reflecting surface 223 can also be a curved surface, for example, a circular curved surface.

If the third reflecting surface 223 is a circular curved surface, in the top view of the plane B, the included angle between any one of tangents of the circular curved surface and the vertical incident light direction is less than the first inclination β1 or the second inclination β2. For example, the included angle is less than the first inclination β1 between a certain tangent of the third reflecting surface 223 close to one side of the first reflecting surface 221 and the vertical incident direction A.

Referring still to FIG. 3, as shown in FIG. 3, the third reflecting surface 223 is a planar surface.

The maximum distance (not shown) between the third reflecting surface 223 and the light input surface 21 of the light guide plate 20 is less than the light mixing distance d of the backlight module; the hollow structure 22 has a hollow length H along the vertical incident direction A; in the same manner, the hollow length H is less than the light mixing distance d of the backlight module to guarantee the reflection of the hollow structure 22 before the light mixing.

Figure 4:
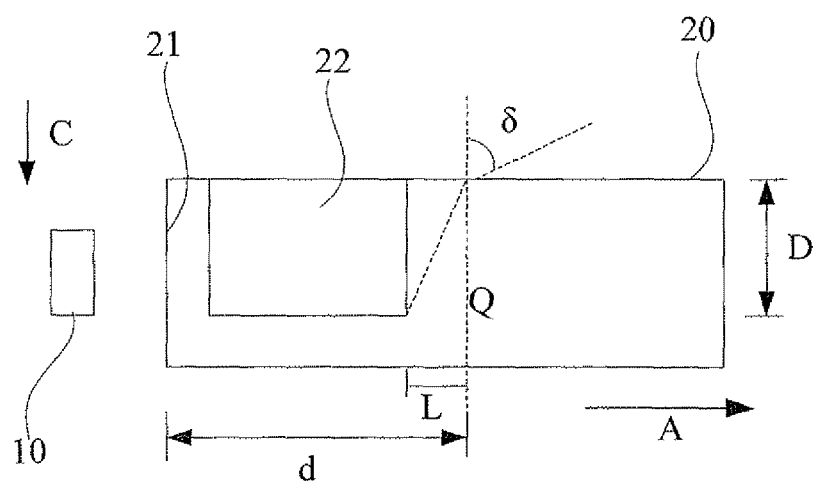
FIG. 4 is a structural schematic side view of FIG. 2.

Referring to FIG. 4, FIG. 4 is a side view of the first preferred embodiment of the backlight module shown in FIG. 2.

The hollow structure 22 has a hollow depth D along the thickness direction C of the light guide plate 20, the third reflecting surface 223 and a light mixing line Q (that is, the line where the light of the adjacent light sources intersects.) of the backlight module have a minimum distance L therebetween; and the hollow structure 22 has a minimum emergent opening angle δ at the light mixing line Q; the hollow depth D, the minimum distance L and the minimum emergent opening angle δ satisfy the following formula:

sin δ≤$n_{LGP}$×sin($a$ tan($L/D$)), wherein $n_{LGP}$ is the refractive index of the light guide plate 20.

The hollow depth D, the minimum distance L and the minimum emergent opening angle δ satisfy the formula, thereby it can effectively prevent the hollow structure 22 from being seen from the minimum emergent opening angle δ and further guarantee the lightening effect.

In the embodiment shown in FIG. 4, the hollow depth D is less than the thickness of the light guide plate 20 (not shown). In the specific embodiment, the hollow depth D also can be equal to the thickness of the light guide plate 20; and the similar examples are omitted hereinafter.

In this embodiment, through modulating the first inclination β1 and the second inclination β2 of the hollow structure 22, the hollow length H and the position in relation to the light source 10 can effectively prevent the hotspot phenomenon.

Together with FIG. 2, several hollow structures 22 are equally spaced along the plane B, the pitch P between the adjacent hollow structures 22 satisfies the following formula:

B≥d/tan(arcsin(1/$n_{LGP}$)).

Figure 5:
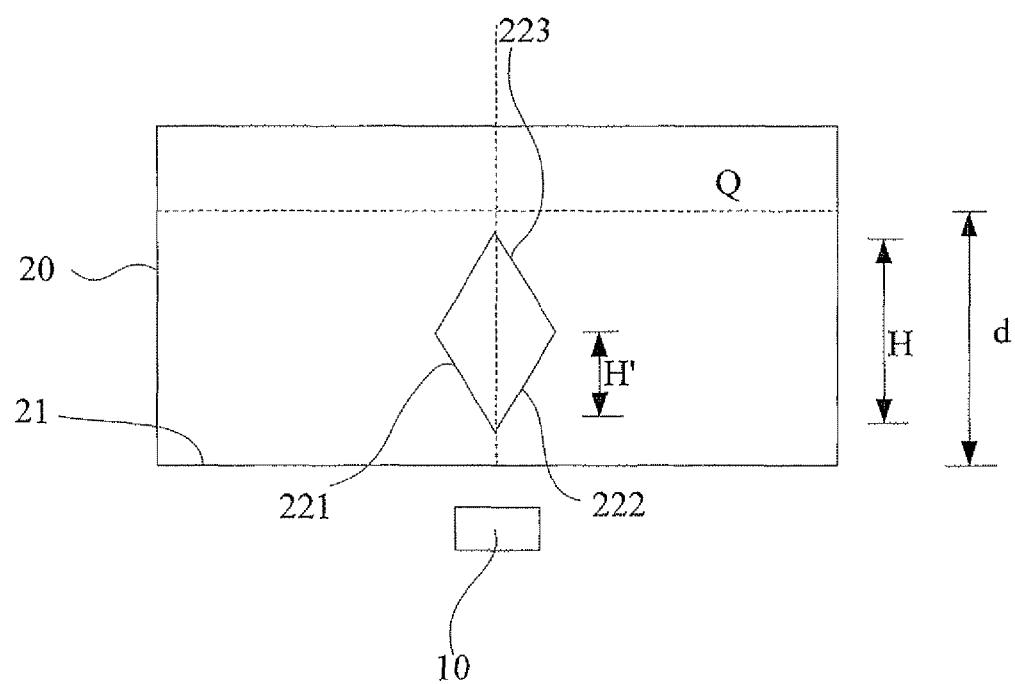
FIG. 5 is a structural schematic top view according to a second preferred embodiment of the backlight module in the present invention.

Referring to FIG. 5, FIG. 5 is a structural schematic top view according to a second preferred embodiment of the backlight module in the present invention.

In the second preferred embodiment, the third reflecting surface 223 is a bending surface; in this embodiment, the control of the hotspot can be realized through controlling the height ratio as ε=H'/H(½≤ε≤1) to reduce the hotspot phenomenon, wherein H' is a maximum distance from the first reflecting surface 221 and the second reflecting surface 222 to the light input surface 21.

Alternatively, if the third reflecting surface 223 is a curved surface, the control of the hotspot can be realized through changing the curvature of the third reflecting surface 223 to reduce the hotspot phenomenon; it will be described more detailed hereinafter.

The present invention further provides a liquid crystal display, the liquid crystal display comprises the backlight module the present invention provides, in view of the backlight module which has been described detailed hereinbefore; the detailed description thereof is thus omitted hereinafter.

The present invention is formed with hollow structures therein. The hollow structures corresponding to the light source can reflect the vertical incident light and the light concentrating around the vertical incident light to present the scattering effect and thereby prevent the intensive distribution in a certain range of the light guide plate and the hotspot phenomenon.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A backlight module, comprising: a light source and a light guide plate; wherein the light guide plate includes a light input surface formed one side thereof, and the light source is close to the light input surface,
wherein the light guide plate is formed with hollow structures therein, the hollow structures are corresponding to the light source, and the light guide plate has a first reflecting surface, a second reflecting surface and a third reflecting surface along a thickness direction of the light guide plate;
wherein the first reflecting surface has a first inclination in relation to a vertical incident direction horizontally perpendicular to the light input surface between the light source and the light guide plate; the second reflecting surface has a second inclination in relation to the vertical incident direction, and the tilt direction of the first inclination is opposite to that of the second inclination; light concentrating around the vertical incident direction entering the light guide plate has a refracting angle, and the sum of the first inclination and the refracting angle is less than or equal to 45°; and
wherein light emitted from the light source corresponding to the hollow structure and emitting toward the first reflecting surface is reflected by the first reflecting surface based on the first inclination; light emitted from the light source corresponding to the hollow structure and emitting toward the second reflecting surface is reflected by the second reflecting surface based on the second inclination;
wherein a maximum distance between the third reflecting surface and the light input surface of the light guide plate is less than a light mixing distance of the backlight module, the hollow structure has a hollow length along the vertical incident direction, and the hollow length is less than the light mixing distance of the backlight module, the third reflecting surface is a circular curved surface, and, on a horizontal surface of the light guide plate, an included angle between the vertical incident direction and any one of the tangents of the circular curved surface is less than the first inclination.

2. The backlight module according to claim 1, wherein the sum of the second inclination and the refracting angle is less than or equal to 45°.

3. The backlight module according to claim 1, wherein an included angle between the vertical incident direction and any one of the tangents of the circular curved surface is less than the second inclination.

4. The backlight module according to claim 1, wherein the hollow structure has a hollow depth D along the thickness direction of the light guide plate; the third reflecting surface and a light mixing line of the backlight module have a minimum distance L therebetween; the hollow structure has a minimum emergent opening angle δ at the light mixing line; the hollow depth, the minimum distance and the minimum emergent opening angle δ satisfy the following formula:

$\sin \delta \leq n_{LGP} \times \sin(a \tan(L/D))$, wherein $n_{LGP}$ is the refractive index of the light guide plate.

5. A backlight module, comprising: a light source and a light guide plate; wherein the light guide plate includes a light input surface formed one side thereof, and the light source is close to the light input surface,
wherein the light guide plate is formed with hollow structures therein, the hollow structures are corresponding to the light source, and the light guide plate has a first reflecting surface and a second reflecting surface along a thickness direction of the light guide plate;
wherein the first reflecting surface has a first inclination in relation to a vertical incident direction horizontally perpendicular to the light input surface between the light source and the light guide plate; the second reflecting surface has a second inclination in relation to the vertical incident direction, and the tilt direction of the first inclination is opposite to that of the second inclination; and
wherein light emitted from the light source corresponding to the hollow structure and emitting toward the first reflecting surface is reflected by the first reflecting surface based on the first inclination; light emitted from the light source corresponding to the hollow structure and emitting toward the second reflecting surface is reflected by the second reflecting surface based on the second inclination;
wherein light concentrating around the vertical incident direction entering the light guide plate has a refracting angle and the sum of the first inclination and the refracting angle is less than or equal to 45°;
wherein a maximum distance between the third reflecting surface and the light input surface of the light guide plate is less than a light mixing distance of the backlight module;
the hollow structure has a hollow length along the vertical incident direction, and the hollow length is less than the light mixing distance of the backlight module;
the third reflecting surface is a circular curved surface;
on a horizontal surface of the light guide plate an included angle between the vertical incident direction and any one of the tangents of the circular curved surface is less than the first inclination.

6. The backlight module according to claim 5, wherein the sum of the second inclination and the refracting angle is less than or equal to 45°.

7. The backlight module according to claim 5, wherein the third reflecting surface is a planar surface.

8. The backlight module according to claim 5, wherein the included angle between the vertical incident direction and any tangent of the circular curved surface is less than the second inclination.

9. The backlight module according to claim 5, wherein the hollow structure has a hollow depth D along the thickness direction of the light guide plate; the third reflecting surface and a light mixing line of the backlight module have a minimum distance L therebetween; the hollow structure has a minimum emergent opening angle δ at the light mixing line; the hollow depth, the minimum distance and the minimum emergent opening angle δ satisfy the following formula:

$\sin \delta \leq n_{LGP} \times \sin(a \tan(L/D))$, wherein $n_{LGP}$ is the refractive index of the light guide plate.

10. A liquid crystal display, comprising: a light source and a light guide plate; wherein the light guide plate includes a light input surface formed one side thereof, and the light source is close to the light input surface;
wherein the light guide plate is formed with hollow structures therein corresponding to the light source, and the light guide plate has a first reflecting surface and a second reflecting surface along a thickness direction of the light guide plate;
wherein the first reflecting surface has a first inclination in relation to a vertical incident direction horizontally perpendicular to the light input surface between the light source and the light guide plate; the second reflecting surface has a second inclination in relation to the vertical incident direction, and the tilt direction of the first inclination is opposite to that of the second inclination; and wherein light emitted from the light source corresponding to the hollow structure and emitting toward the first reflecting surface is reflected by the first reflecting surface based on the first inclination; light emitted from the light source corresponding to the hollow structure and emitting toward the second reflecting surface is reflected by the second reflecting surface based on the second inclination;

wherein light concentrating around the vertical incident direction entering the light guide plate has a refracting angle, and the sum of the first inclination and the refracting angle is less than or equal to 45°;

wherein a maximum distance between the third reflecting surface and the light input surface of the light guide plate is less than a light mixing distance of the backlight module;

the hollow structure has a hollow length along the vertical incident direction, and the hollow length is less than the light mixing distance of the backlight module;

the third reflecting surface is a circular curved surface;

on a horizontal surface of the light guide plate, an included angle between the vertical incident direction and any one of the tangents of the circular curved surface is less than the first inclination.

* * * * *